United States Patent
Mao et al.

(10) Patent No.: US 9,469,817 B2
(45) Date of Patent: Oct. 18, 2016

(54) HYDROCRACKING CATALYST AND USE OF THE SAME

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Yichao Mao, Beijing (CN); Hong Nie, Beijing (CN); Mingfeng Li, Beijing (CN); Qinghe Yang, Beijing (CN); Zhihai Hu, Beijing (CN); Runqiang Zhang, Beijing (CN); Guangle Zhao, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 119 days.

(21) Appl. No.: 14/626,233

(22) Filed: Feb. 19, 2015

(65) Prior Publication Data
US 2015/0231618 A1      Aug. 20, 2015

(30) Foreign Application Priority Data

Feb. 20, 2014  (CN) ............................ 2014 1 0058136
Feb. 20, 2014  (CN) ............................ 2014 1 0058137

(51) Int. Cl.
*C10G 47/20*  (2006.01)
*C10G 47/12*  (2006.01)
*B01J 37/08*  (2006.01)

(Continued)

(52) U.S. Cl.
CPC ................ *C10G 47/20* (2013.01); *B01J 23/85* (2013.01); *B01J 29/076* (2013.01); *B01J 29/166* (2013.01); *B01J 29/26* (2013.01); *B01J 29/48* (2013.01); *B01J 29/7815* (2013.01); *B01J 35/002* (2013.01); *B01J 37/0203* (2013.01); *B01J 37/086* (2013.01); *C10G 47/12* (2013.01);

(Continued)

(58) Field of Classification Search
CPC ...... C10G 47/10; C10G 47/12; C10G 47/16; C10G 47/20; B01J 2229/186; B01J 2229/42; B01J 37/0018; B01J 37/20; B01J 37/28; B01J 21/12; B01J 35/1019; B01J 35/1023; B01J 35/1038; B01J 35/1042; B01J 35/1047
See application file for complete search history.

(56) References Cited

FOREIGN PATENT DOCUMENTS

| CN | 1055961 C | 8/2000 |
|---|---|---|
| CN | 1112245 C | 6/2003 |

(Continued)

*Primary Examiner* — Brian McCaig
(74) *Attorney, Agent, or Firm* — Novick, Kim & Lee, PLLC; Allen Xue

(57) ABSTRACT

A hydrocracking catalyst comprises a support, at least one of VIII Group metal components, and at least one of VIB Group metal components. The support comprises an acidic silica-alumina component and alumina derived from a pseudo-boehmite component, wherein the content of the acidic silica-alumina component is 3-80 wt %, the content of alumina derived from the pseudo-boehmite component is 20-95 wt %, based on the support. The support is obtained by mixing, molding, drying and calcining the acidic silica-alumina component with the pseudo-boehmite component, wherein said pseudo-boehmite component comprises pseudo-boehmite PB1 and pseudo-boehmite PB2, wherein the content of PB1 is 10-90 wt % and the content of PB2 is 0-60 wt % on a dry basis and based on the support.

15 Claims, 2 Drawing Sheets an XRD spectrogram of pseudo-boehmites

(51) Int. Cl.
| | |
|---|---|
| *B01J 23/85* | (2006.01) |
| *B01J 29/076* | (2006.01) |
| *B01J 29/16* | (2006.01) |
| *B01J 29/26* | (2006.01) |
| *B01J 29/48* | (2006.01) |
| *B01J 29/78* | (2006.01) |
| *B01J 35/00* | (2006.01) |
| *B01J 37/02* | (2006.01) |
| *C10G 47/10* | (2006.01) |
| *C10G 47/16* | (2006.01) |
| *B01J 21/12* | (2006.01) |
| *B01J 37/20* | (2006.01) |
| *B01J 37/28* | (2006.01) |
| *B01J 35/10* | (2006.01) |
| *B01J 37/00* | (2006.01) |

(52) U.S. Cl.
CPC ............ *B01J21/12* (2013.01); *B01J 35/1019* (2013.01); *B01J 35/1023* (2013.01); *B01J 35/1038* (2013.01); *B01J 35/1042* (2013.01); *B01J 35/1047* (2013.01); *B01J 37/0018* (2013.01); *B01J 37/20* (2013.01); *B01J 37/28* (2013.01); *B01J 2229/186* (2013.01); *B01J 2229/42* (2013.01)

(56) References Cited

FOREIGN PATENT DOCUMENTS

| | | | | |
|---|---|---|---|---|
| CN | 1205315 | C | 6/2005 | |
| CN | 1312039 | C | 4/2007 | |
| CN | 100999328 | B | 4/2011 | |
| CN | 102161002 | A * | 8/2011 | ............ B01J 23/888 |
| CN | 102161492 | A * | 8/2011 | ................ C01F 7/30 |

* cited by examiner

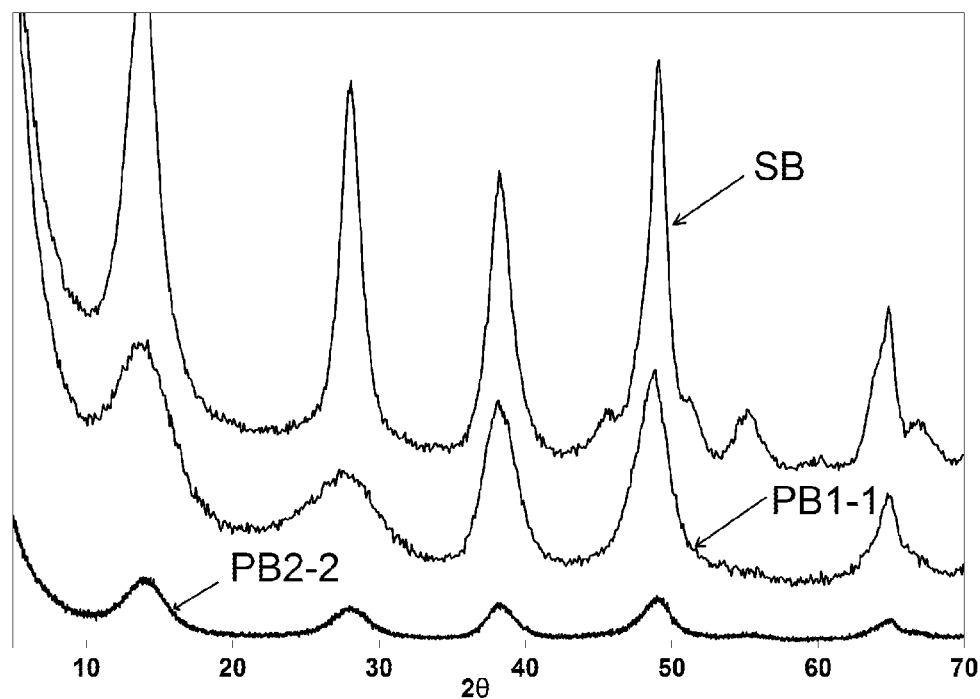
Fig. 1 an XRD spectrogram of pseudo-boehmites

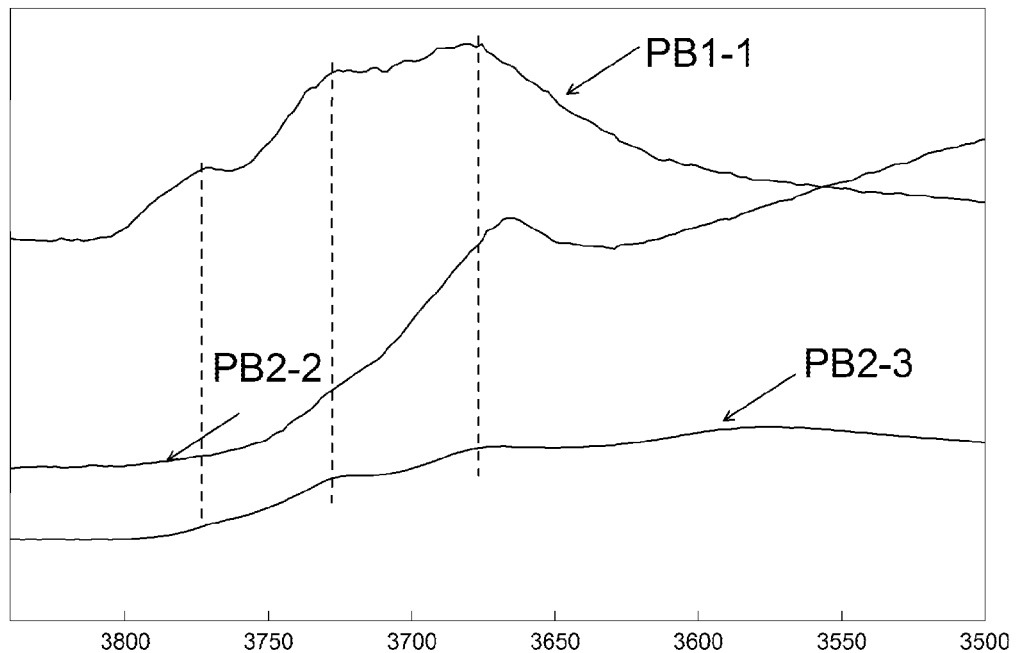
Fig. 2 an IR-OH spectrogram of pseudo-boehmites

HYDROCRACKING CATALYST AND USE OF THE SAME

TECHNICAL FIELD

This invention relates to a hydrocracking catalyst and use of the same

BACKGROUND

In an industrial hydrocracking, the feed may comprise 350-540° C. fraction such as vacuum gas oils (VGO) and the like and the reaction temperature is generally between 350 and 440° C. Components having a higher boiling point in the feed are in a liquid form contacting with catalysts during the reaction. Accordingly, the porous structure of the catalysts is very important. Increasing the pore diameter of the support is needed so as to increase the accessibility of reactant molecules to hydrogenation-active metal within the catalysts. A molecular sieve and metal sulfides have rather small pore volume, and more particular, have less macropores and mesopores which meet the requirements associated with macromolecular hydrocarbon feed required by petroleum processing. It is generally modified by introducing a heat-resistant inorganic oxide matrix with a large pore volume into a hydrocracking catalyst support, such as introducing alumina matrix.

A Chinese patent ZL97121663.0 discloses a hydrocracking catalyst suitable for producing a middle fraction oil, containing an amorphous silica-alumina component and a micropore alumina adhesive as a support and at least one element of the VIB group and at least one element of the VIII group as hydrogenation metals, wherein the amorphous silica-alumina component is in an amount of 30-60 wt %, the total content of the hydrogenation metals is in an range of 20-35 wt % as calculated on oxide and the balance is the micropore alumina adhesive, characterized in that the catalyst has a specific surface of 150-300 m²/g, a pore volume of 0.25-0.50 ml/g, a distribution of the pore having a diameter of 4-15 nm in a range of 60-90% and an infrared acidity of 0.30-0.50 mmol/g.

A Chinese patent ZL01123765.1 discloses a catalyst for hydrotreating diesel oil. The catalyst contains a support, and molybdenum and/or tungsten and nickel and/or cobalt supported on the support, characterized in that the support is consisting of alumina and a zeolite, with a weight-ratio of alumina to the zeolite in a range of 90:10-50:50, wherein the alumina is a composite of a micropore alumina and a macropore alumina in a weight-ratio of 75:25-50:50. The micropore alumina is one wherein the pore volume of the pore having a diameter less than 80 angstrom comprises more than 95% of the total pore volume, while the macropore alumina is one wherein the pore volume of the pore having a diameter of 60-600 angstrom comprises more than 70% of the total pore volume.

SUMMARY OF THE INVENTION

The present invention is to provide a hydrocracking catalyst with improved properties and use of the same.

This invention covers the following items:

1. A hydrocracking catalyst, comprising a support and at least one of VIII Group metal components and at least one of VIB Group metal components, wherein said support comprises an acidic silica-alumina component and alumina derived from a pseudo-boehmite component, wherein the content of the acidic silica-alumina component is 3-80 wt %, the content of alumina derived from the pseudo-boehmite component is 20-95 wt %, based on the support, characterized in that said support is obtained by mixing, moulding, drying and calcining the acidic silica-alumina component with the pseudo-boehmite component, wherein said pseudo-boehmite component comprises pseudo-boehmite PB1 and pseudo-boehmite PB2, wherein the content of PB1 is 10-90 wt % and the content of PB2 is 0-60 wt % on a dry basis and based on the support, when characterizing PB1 by X-ray diffraction, $\kappa_1$ and $\kappa_2$ of said PB1 are respectively from more than 1 to less than or equal to 3, wherein $\kappa_1=h_2/h_1$, $\kappa_2=h_3/h_2$, and $h_1$, $h_2$ and $h_3$ are respectively peak height of three diffraction peaks in the X-ray diffraction pattern of PB1 at 2θ angle of 24-30°, 35-41° and 46-52°, when characterizing PB2 by infrared spectrogram, δ value of PB2 is 1.5-4.5, wherein $\delta=I_1/(I_2+I_3)$, $I_1$ is the peak height of absorption peak at 3665-3680 cm$^{-1}$ in the infrared spectrogram of hydroxy group of PB2, $I_2$ is the peak height of absorption peak at 3720-3730 cm$^{-1}$, and $I_3$ is the peak height of absorption peak at 3760-3780 cm$^{-1}$.

2. The catalyst according to item 1, characterized in that the content of the acidic silica-alumina component is 5-65 wt %, the content of alumina derived from the pseudo-boehmite component is 30-90 wt %, based on the support.

3. The catalyst according to any one of the preceding items, characterized in that when characterizing PB1 by X-ray diffraction, $\kappa_1$ and $\kappa_2$ of PB1 are respectively 1.02-2.4; preferably $\kappa_1$ of said PB1 is 1.2-2.3, and $\kappa_2$ is 1.02-1.4.

4. The catalyst according to any one of the preceding items, characterized in that the specific surface area of PB1 is 100-350 m²/g, and the pore volume of PB1 is 0.7-1.2 ml/g.

5. The catalyst according to any one of the preceding items, characterized in that the specific surface area of PB1 is 150-280 m²/g, and the pore volume of PB1 is 0.85-1.12 ml/g.

6. The catalyst according to any one of the preceding items, characterized in that the acidic silica-alumina component comprises zeolite and/or an amorphous silica-alumina.

7. The catalyst according to item 6, characterized in that the zeolite is selected from a group consisting of a zeolite having a faujasite structure, a zeolite having Beta zeolite structure or a zeolite having a mordenite structure.

8. The catalyst according to item 7, characterized in that the zeolite is one or more Y-type molecular sieves selected from a group consisting of a HY-zeolite, a rare earth type Y-zeolite (REY), a rare earth type HY-zeolite (REHY), a ultrastable Y-zeolite (USY), a rare-earth type ultrastable Y-zeolite (REUSY), and a dealuminized Y-zeolite.

9. The catalyst according to item 8, characterized in that the Y-type molecular sieve is a ultrastable Y-type molecular sieve.

10. The catalyst according to item 9, characterized in that the lattice constant of the Y-type molecular sieve is 2.460-2.430 nm, the specific surface area is 550-700 m²/g, and the pore volume is 0.30-0.45 ml/g.

11. The catalyst according to any of items 8-10, characterized in that the Y-type molecular sieve contains phosphor, and the content of phosphor is 0.1-2.5 wt %, based on the molecular sieve.

12. The catalyst according to item 11, characterized in that the content of phosphor is 0.4-2.0 wt %, based on the molecular sieve.

13. The catalyst according to item 6, characterized in that, based on the amorphous silica-alumina, the content of alumina in the amorphous silica-alumina is 10-80 wt %, preferably 15-55%.

14. The catalyst according to item 6, characterized in that, the amorphous silica-alumina has a specific surface area of 350-750 m²/g and a pore volume of 0.4-1.2 ml/g, preferably a specific surface area of 400-650 m²/g and a pore volume of 0.45-0.95 ml/g.

15. The catalyst according to any one of the preceding items, characterized in that the VIII Group metal component(s) is/are selected from nickel and/or cobalt, and the VIB Group metal component(s) is/are selected from molybdenum and/or tungsten, wherein the content of the nickel and/or cobalt is 1-15 wt % and the content of molybdenum and/or tungsten is 5-40 wt % as calculated on oxide and based on weight of the catalyst.

16. The catalyst according to item 15, characterized in that the content of the nickel and/or cobalt is 2.0-10 wt % and the content of molybdenum and/or tungsten is 10-35 wt % as calculated on oxide and based on weight of the catalyst.

17. The catalyst according to any one of the preceding items, characterized in that the content of PB1 is 10-90 wt %, and the content of PB2 is 5-60 wt % on a dry basis and based on the support, preferably, the content of PB1 is 20-80 wt %, and the content of PB2 is 10-50 wt on a dry basis and based on the support 18. The catalyst according to any one of the preceding items, characterized in that the δ value of PB2 is 1.8-3.8.

19. The catalyst according to any one of the preceding items, characterized in that conditions for the drying include a temperature of 50-350° C. and a time of 1-24 hrs; conditions for the calcining include a temperature of 400-700° C. and a time of 0.5-6 hrs.

20. The catalyst according to item 19, characterized in that conditions for the drying include a temperature of 80-200° C. and a time of 1-6 hrs; conditions for the calcining include a temperature of 550-650° C. and a time of 1-3 hrs.

21. The catalyst according to any one of the preceding items, characterized in that PB2 is a modified product of PB1 obtained by drying PB1 at a temperature of 70-400° C. for 0.5-14 hrs.

22. The catalyst according to any one of the preceding items, characterized in that PB2 is a modified product of PB1 obtained by drying PB1 at a temperature of 220-330° C. for 1-6 hrs.

23. Use of the catalyst according to any one of items 1-22 in processing hydrocarbon oils.

In one embodiment, the acidic silica-alumina component comprises an amorphous silica-alumina. The amorphous silica-alumina is commercially available, or may be prepared according to any conventional process. It is preferable to use amorphous silica-alumina having a specific surface area of 350-750 m²/g and a pore volume of 0.4-1.2 ml/g, further preferably those having a specific surface area of 400-650 m²/g and a pore volume of 0.45-0.95 ml/g. Based on the amorphous silica-alumina, the content of alumina in the amorphous silica-alumina is 10-80 wt %, preferably 15-55%.

In one embodiment, the acidic silica-alumina component comprises zeolite. The zeolite may be one or more zeolite molecular sieves that are commonly used as active components for cracking reaction. The zeolite may be a zeolite molecular sieve having a macroporous structure, such as, a zeolite molecular sieve having a faujasite structure, a Beta zeolite structure or a Ω zeolite structure; a zeolite molecular sieve having a mesopore structure, such as a zeolite molecular sieve having a mordenite structure, a ZSM-5 zeolite structure, a ZSM-11 zeolite structure, a ZSM-22 zeolite structure, a ZSM-23 zeolite structure, a ZSM-35 zeolite structure, a ZSM-48 zeolite structure or a ZSM-57 zeolite structure, and the like; or a zeolite molecular sieve having a micropore structure, such as a zeolite molecular sieve having an Erionite zeolite structure or a ZSM-34 zeolite structure. In a preferred embodiment, the zeolite molecular sieve is one or more selected from the group consisting of a zeolite molecular sieve having a faujasite structure, a zeolite molecular sieve having a Beta zeolite structure, and a zeolite molecular sieve having a mordenite structure.

In another embodiment of the present invention, the zeolite molecular sieve is a Y-zeolite molecular sieve.

In a further embodiment of the present invention, the Y-type molecular sieve is selected from the group consisting of HY (hydrogen Y-type molecular sieve), REY (rare earth Y-type molecular sieve), PY (phosphor-containing Y-type molecular sieve), USY (a ultrastable Y-type molecular sieve), PUSY (phosphor-containing USY, comprising PHY, REUSY (rare-earth ultrastable Y)), preferably USY and PUSY, and further preferably PUSY. The molecular sieve is commercially available, or can be prepared according to any conventional process, for example, the method of preparing USY disclosed in a Chinese patent ZL00123139.1 and the method of preparing PUSY disclosed in a Chinese patent ZL200410071122.6, both of which are cited herewith for reference.

The moulding may be carried out by a conventional process, such as extruding moulding. Suitable amount of extrusion assistant and/or adhesive can be added before extrusion moulding. The type and amount of extrusion assistant and adhesive are well known by those skilled in the art. Accordingly, it is no longer explained in detail here.

The methods for the drying and calcining may be conventional methods, for example, drying by heating with an oven, mesh belt, or convertor at a temperature of 50-350° C., preferably 70-200° C., for 1-24 hrs, preferably 2-6 hrs; calcining by heating with an oven, mesh belt, or convertor at a temperature of 350-800° C., preferably 400-700° C., for 0.5-6 hrs, preferably 1-4 hrs.

The inventor of the present invention surprisingly finds that, by using a support comprising an acidic silica-alumina component and alumina derived from a pseudo-boehmite component in preparing a hydrocracking catalyst, the resulting catalyst has a better performance in converting aromatic hydrocarbons. Said pseudo-boehmite component comprises or consists of pseudo-boehmite PB1 and pseudo-boehmite PB2, wherein the content of PB1 is 10-90 wt % and the content of PB2 is 0-60 wt % on a dry basis and based on the support. Preferably, the content of PB1 is 10-90 wt % and the content of PB2 is 5-60 wt % on a dry basis and based on the support. More preferably, the content of PB1 is 20-80 wt % and the content of PB2 is 10-50 wt % on a dry basis and based on the support. The total amount of components of the support is 100 wt %, when characterizing PB1 by X-ray diffraction, $\kappa_1$ and $\kappa_2$ of said PB1 are respectively from more than 1 to less than or equal to 3, wherein $\kappa_1=h_2/h_1$, $\kappa_2=h_3/h_2$, and $h_1$, $h_2$ and $h_3$ are respectively peak height of three diffraction peaks in the X-ray diffraction pattern of PB1 at 2θ angle of 24-30°, 35-41° and 46-52°, when characterizing PB2 by infrared spectrogram, δ value of PB2 is 1.5-4.5, wherein $\delta=I_1/(I_2+I_3)$, $I_1$ is the peak height of absorption peak at 3665-3680 $cm^{-1}$ in the infrared spectrogram of hydroxy group of PB2, $I_2$ is the peak height of absorption peak at 3720-3730 $cm^{-1}$, and $I_3$ is the peak height of absorption peak at 3760-3780 $cm^{-1}$.

According to one embodiment of the present invention, PB1 has $\kappa_1$ and $\kappa_2$ of 1.02-2.3, respectively. More preferably, PB1 has $\kappa_1$ of 1.2-2.3 and $\kappa_2$ of 1.02-1.4.

On the premise of meeting the above requirements of the present invention, there is no special limitation on the source of PB1 in the present invention. For example, PB1 is commercially available or may be prepared according to any conventional process. For example, one kind of pseudo-boehmite prepared by neutralizing aluminium sulphate and sodium metaaluminate as disclosed in a Chinese patent application CN100999328B, which is cited herewith for reference, meets requirements of the present invention.

In one embodiment of the present invention, PB1 is prepared by a method including steps of 1) reacting aluminium sulphate with an alkali material at a temperature of 30-55° C., 2) adjusting pH of the reaction mixture to 8.0-10.0, 3) keeping the reaction mixture at a constant temperature of 30-60° C., and 4) filtering, washing with water and drying the product of step 3).

In one embodiment of the present invention, on the premise that the values of $\kappa_1$ and $\kappa_2$ of PB1 meet the above requirements, PB1 is pseudo-boehmite having a specific surface area of 100-350 m$^2$/g and a pore volume of 0.7-1.2 ml/g, more preferably, pseudo-boehmite having a specific surface area of 150-280 m$^2$/g and a pore volume of 0.85-1.12 ml/g.

In the present invention, the pore volume and specific surface area of said pseudo-boehmite is obtained by calcining said pseudo-boehmite at a temperature of 600° C. for 4 hrs and then characterizing by BET nitrogen absorption.

PB2 is a modified product of PB1 obtained by drying the pseudo-boehmite PB1 meeting the aforesaid requirements at a temperature of 70-400° C. for 0.5-14 hrs, preferably at a temperature of 220-330° C. for 1-6 hrs. When characterizing PB2 by infrared spectrogram, PB2 has a $\delta$ value of 1.5-4.5, preferably 1.8-3.8.

The amounts of the VIII Group metal component and the VIB Group metal component used in the catalyst of the present invention are in conventional amounts used in any hydrocracking catalysts. For example, as calculated on oxide and based on weight of the catalyst, said catalyst comprises 1-10 wt % of the VIII Group metal component and 5-40 wt % of the VIB Group metal component, preferably, 1.5-7 wt % of the VIII Group metal component and 7-35 wt % of the VIB Group metal component. Said VIB Group metal component is one or more metals selected from Cr, Mo or W, preferably Mo and/or W. Said VIII Group metal component is one or more metals selected from Fe, Co or Ni, preferably Co and/or Ni.

There is no special limitation on the specific supporting method, so long as the at least one VIII Group metal component and the at least one VIB Group metal component are supported on the support. The preferred method is an impregnation method, comprising formulating, separately or simultaneously, impregnation solutions comprising compounds of the VIII Group metal and of the VIB Group metal. Said impregnation may be classified as impregnation with excessive liquid, saturation impregnation according to the amount of impregnation solution, or may be classified as soaking impregnation, showering impregnation and the like according to the means by which the impregnation is achieved. It is easily understood for those skilled in the art that, by adjusting and controlling the concentration and amount of the impregnation solution or the amount of the support, the catalyst of the present invention can be prepared at any amount. Therefore it is no longer explained in detail here.

In the preparation of the catalyst of the present invention, said compounds of the VIB Group metal may be one or more compounds selected from soluble compounds of said metal, for example, one or more compounds selected from the group consisting of silicotungstic acid, silicotungstic acid salt, phosphomolybdic acid, phosphomolybdate, molybdate, paramolybdate, tungstate, metatungstate and ethyl metatungstate.

Said compounds of the VIII Group metal compound may be selected from salts of said metal, including inorganic salts or organic salts thereof. For example, said inorganic salt is one or more salts selected from the group consisting of nitrate, carbonate, basic carbonate, hypophosphite, phosphate, sulphate, chloride and partial decomposition products of these salts, preferably, one or more salts selected from nitrate, carbonate or basic carbonate. Said organic salt is a salt or a soluble complex produced by combining an organic compound with the VIII Group metal, wherein the organic compound may be organic base, organic carboxylic acid, amines, ketones, ethers or alkyls, preferably organic carboxylate.

The catalyst of the present invention may further comprise an organic additive in a content of not more than 10 wt %, preferably not more than 6 wt %, calculated on carbon element and based on weight of the catalyst. The total amount of components of the catalyst of the present invention is 100 wt %.

Said organic additive may be one or more compounds selected from oxygen-containing and/or nitrogen-containing organic compounds. For example, said oxygen-containing compound may be one or more compounds selected from organic alcohols and organic acids. Said nitrogen-containing organic compound may be one or more compounds selected from organic amines and organic ammonium salts. More specifically, said oxygen-containing organic compound is one or more compounds selected from the group consisting of ethylene glycol, glycerol, polyethylene glycol (with a molecular weight of 200-1500), diethylene glycol, butanediol, acetic acid, maleic acid, oxalic acid, aminotriacetic acid, 1,2-cyclohexane-diamine-tetraacetic acid, citric acid, tartaric acid, and malic acid, preferably selected from the group consisting of ethylene glycol, glycerol, polyethylene glycol and citric acid. Said nitrogen-containing organic compound is one or more compounds selected from ethylene diamine, diethylenetriamine, cyclohexanediaminetetraacetic acid, aminoacetic acid, nitrilotriacetic acid, EDTA and ammonium salts, preferably EDTA and nitrilotriacetic acid. Said organic additive may comprise organic alcohols and organic acids simultaneously.

When the catalyst of the present invention further comprises an organic compound, the preparation method of the catalyst further comprises a step of introducing the organic compound. It may be introduced, simultaneously or after, the introduction of the VIII Group metal, followed by the drying. Preferably, the organic compound and the VIII Group metal are mixed in a solution and introduced by impregnation, followed by the drying. Temperature and time for the drying are selected so that it not only does not lead to the decomposition of the VIII Group metal salt or complex, but also allow the maintenance of most of the introduced organic compound in the catalyst. For example, more than 50% of the organic compound, preferably, more than 70% of the organic compound is maintained. The method used may be any method in the art that can achieve the above objects, for example, drying by heating, vacuum drying, drying by heating under vacuum, etc. When drying by heating is used, the temperature is not more than 250° C., preferably not more than 200° C., and more preferably not more than 180° C. For example, in one preferred embodiment, the temperature is 70-180° C.

According to this invention, when preparing a catalyst comprising the organic compound, it is preferred to select the amount of the organic compound as introduced so that the organic additive in the resulting catalyst is in an amount of not more than 10 wt % and more preferably not more than 6 wt %, calculated on carbon element and based on weight of the catalyst.

According to the conventional method in the art, the hydrotreating catalyst is generally pre-sulfurized with sulfur, hydrogen sulfide or sulfur-containing feedstock in the presence of hydrogen at a temperature of 140-370° C. before being used. Such presulfurization may be operated out of the reactor or in the reactor. By such presulfurization, the supported active metal components are converted into metal sulfide components.

The catalyst of the invention can be used for hydrocracking or hydromodifying various types of hydrocarbon oil feedstocks. Reaction conditions for the hydrocracking or the hydromodifying are those commonly used, for example, a reaction temperature of 200-420° C., preferably 220-400° C., a pressure of 2-18 MPa, preferably 2-15 MPa, a liquid hourly space velocity of 0.3-10 hrs$^{-1}$, preferably 0.3-5 hrs$^{-1}$ and a hydrogen/oil volume ratio of 50-5000, preferably 50-4000.

The hydrocracking or hydromodifying reaction can be carried out in any reaction apparatus, such as a fixed bed reactor, a fluidized bed reactor or an ebullated bed reactor, which make feedstock oils contact and react with the catalyst under the corresponding hydrotreating reaction conditions.

The catalyst of the invention has better performance in hydrodearomatization as compared with the prior art catalysts. For example, when processing a catalytic cracking tail oil with the catalyst of the invention at a medium pressure of 6.4 MPa, the content of aromatic hydrocarbons in the tail oil is relatively lowered by up to 10-30%.

BRIEF DESCRIPTION OF THE DRAWINGS

The drawings are to facilitate further understanding of the present invention and constitute a part of the description. They are used together with the subsequent detail description of the exemplary embodiments to set forth the present invention, but not to limit the present invention. In the drawings:

FIG. 1 is an XRD spectrogram of pseudo-boehmites, wherein PB1-1 is a pseudo-boehmite meeting requirements of the invention; PB2-2 is a modified product of PB1-1; SB (pseudo-boehmite produced by Sasol Company, trade name: SD powder) is a pseudo-boehmite failing to meet requirements of the invention.

FIG. 2 is an IR-OH spectrogram of pseudo-boehmites, wherein PB2-1 is a modified product of PB1-1; PB2-2 is another modified product of PB1-1; PB2-3 is a product of PB1-1 obtained by calcining PB1-1 at 600° C.

DETAILED DESCRIPTION OF THE EXEMPLARY EMBODIMENTS

This invention is further set forth through examples as follows.

In experiments, XRD was carried out on a D5005 type X-ray diffractometer of Siemens AG, having a Cu target, Ka ray, a solid detector, a tube voltage of 40 kV, a tube current of 40 mA, step scanning, a step of 0.02°, and a scanning scope of 5-70°.

The IR-OH spectrogram was measured by FT3000 type Fourier Transform Infrared Spectrometer of BIO-RAD Company, U.S.A, including steps of forming a self-supporting film of 15 mm, keeping under vacuum of $10^{-3}$ Pa for 1 hr, cooling to room temperature, and scanning over a scope of 1000-4000 cm$^{-1}$.

The pseudo-boehmites used in the examples and comparative examples, the preparation process or source of the same were listed as follow:

PB1-1

500 ml of a clear and transparent solution of aluminium sulphate with a concentration of 93 g/L and a solution of sodium metaaluminate with a concentration of 195 g/L (having a caustic coefficient of 1.6) were simultaneously slowly added to a 2 L reactor with stirring. The reaction was controlled at a temperature of 40° C. and a pH of 7.3. After the reaction was completed, a solution of sodium carbonate with a concentration of 0.5 mol/L was added into the reaction mixture with stirring until the pH of the reaction mixture was 9.7. The reaction mixture was kept at a constant temperature of 50° C. for 1 hr, filtered, washed with deionized water for three times, dried at 120° C. with air for 3 hrs to obtain pseudo-boehmite PB1-1. h1, h2, h3, $k_1$, $k_2$ and pore volume of PB1-1 are listed in Table 1.

PB1-2

600 ml of a clear and transparent solution of aluminium sulphate with a concentration of 48 g/L and aqueous ammonia with a concentration of 8% were simultaneously slowly added to a 2 L reactor with stirring. The reaction mixture was filtered. Aqueous ammonia was further added into the reaction mixture. The reaction was controlled at a temperature of 35° C. and a pH of 6.0. After the reaction was completed, the reaction mixture was filtered. The filter cake was made into a slurry. Sodium carbonate was added into the slurry with stirring until pH of the solution was 9.5. The reaction mixture was kept at a constant temperature of 35° C. for 12 hr, filtered, washed with deionized water for three times, dried at 120° C. with air for 3 hrs to obtain pseudo-boehmite PB1-2. h1, h2, h3, $k_1$, $k_2$ and pore volume of PB1-2 are listed in Table 1.

PB1-3

600 ml of a clear and transparent solution of aluminium sulphate with a concentration of 93 g/L and aqueous ammonia with a concentration of 8% were simultaneously slowly added to a 2 L reactor with stirring. The reaction was controlled at a temperature of 50° C. and a pH of 4.6. After the reaction was completed, the reaction mixture was filtered. The filter cake was made into a slurry. Ammonium bicarbonate was added into the slurry with stirring until pH of the solution was 8.4. The reaction mixture was kept at a constant temperature of 35° C. for 0.5 hrs, filtered, washed with deionized water for three times, dried at 120° C. with air for 3 hrs to obtain pseudo-boehmite PB1-3. h1, h2, h3, $k_1$, $k_2$ and pore volume of PB1-3 are listed in Table 1.

SB

SB is a pseudo-boehmite produced by Sasol Company with a trade name of SD powder. h1, h2, h3, $k_1$, $k_2$ and pore volume of SB are listed in Table 1.

TABLE 1

|  | h1 | h2 | h3 | $k_1$ | $k_2$ | pore volume |
|---|---|---|---|---|---|---|
| PB1-1 | 1300 | 2400 | 2913 | 1.85 | 1.21 | 1.0 |
| PB1-2 | 1223 | 2721 | 3730 | 2.22 | 1.37 | 0.85 |
| PB1-3 | 1860 | 2984 | 3211 | 1.60 | 1.08 | 1.10 |
| PB2-1 | 424 | 540 | 581 | 1.27 | 1.08 | 0.98 |
| PB2-2 | 514 | 615 | 674 | 1.20 | 1.10 | 0.98 |
| SB | 5740 | 4278 | 6089 | 0.74 | 1.42 | 0.55 |

SB cannot meet requirements of the present invention.

The modified product of the pseudo-boehmite used in the examples and comparative examples and the preparation process of the same were listed below:

PB2-1

300 g PB1-1 was put in a muffle furnace, heated to 250° C., and kept at the temperature constant for 3 hrs to obtain PB2-1. I1, I2, I3 and δ of PB2-1 are listed in Table 2.

PB2-2

300 g PB1-1 was put in a muffle furnace, heated to 300° C., and kept at the temperature constant for 3 hrs to obtain PB2-2. I1, I2, I3 and δ of PB2-2 are listed in Table 2.

PB2-3

300 g PB1-1 was put in a muffle furnace, heated to 600° C., and kept at the temperature constant for 3 hrs to obtain PB2-3. I1, I2, I3 and δ of PB2-3 are listed in Table 2.

PB2-4

300 g PB1-2 was put in a muffle furnace, heated to 230° C., and kept at the temperature constant for 5 hrs to obtain PB2-4. I1, I2, I3 and δ of PB2-4 are listed in Table 2.

PB2-5

300 g PB1-3 was put in a muffle furnace, heated to 300° C., and kept at the temperature constant for 2 hrs to obtain PB2-5. I1, I2, I3 and δ of PB2-5 are listed in Table 2.

TABLE 2

|  | I1 | I2 | I3 | δ |
|---|---|---|---|---|
| PB1-1 | 0.226 | 0.547 | 0.641 | 0.8 |
| PB2-1 | 0.041 | 0.314 | 0.807 | 2.3 |
| PB2-2 | 0.014 | 0.126 | 0.512 | 3.7 |
| PB2-3 | 0.056 | 0.204 | 0.2961 | 1.1 |
| PB2-4 | 0.081 | 0.351 | 0.792 | 1.8 |
| PB2-5 | 0.022 | 0.116 | 0.489 | 3.5 |

Comparative Example 1

298 g pseudo-boehmite SB (with a dry basis of 0.75, measured by placing a certain amount of powder as obtained in a crucible with a cover, putting it in a muffle furnace, raising the temperature to 700° C. and keeping the temperature constant for 1 hr, and then calculating the ratio of the remained powder to the initial powder, the same hereinafter) was mixed with 366.7 g ultrastable molecular sieve LAY (manufactured by Sinopec Catalyst Company Chang Ling Catalyst Plant, with a lattice constant of 24.85 angstrom, a pore volume of 0.39 ml/g, a dry basis of 0.75) and 16 g sesbania powder, then was extruded into a trefoil strand having a circumcircle diameter of 1.6 mm, dried at 120° C. for 3 hrs and calcined at a temperature of 600° C. for 3 hrs, to obtain a support. The composition of such catalyst support was shown in Table 3.

After cooled to room temperature, 100 g support was weighted and impregnated with 68 ml aqueous solution containing 50 g ammonium metatungstate (manufactured by Sichuan Zigong Hard Alloy Factory, with a tungsten oxide content of 82 wt %), 8.7 g basic nickel carbonate (manufactured by Jiangsu Yixing Xuchi Chemical Ltd., with a nickel oxide content of 51 wt %), and 10.5 g citric acid, then dried at 180° C. for 10 hrs to obtain a catalyst, named as catalyst R-1. Based on the total amount of the catalyst, the mass fractions (calculated value, the same hereinafter) of metal components in R-1 were listed in Table 3.

Example 1

300 g pseudo-boehmite powder PB1-1 (with a dry basis of 0.75) was mixed with 366.7 g ultrastable molecular sieve LAY and 16 g sesbania powder, then extruded into a trefoil strand having a circumcircle diameter of 1.6 mm, dried at 120° C. for 3 hrs and calcined at 600° C. for 3 hrs to obtain a support. The composition of such catalyst support was shown in Table 3.

After cooled to room temperature, 100 g support was weighted and impregnated with 77 ml aqueous solution containing 51 g ammonium metatungstate (manufactured by Sichuan Zigong Hard Alloy Factory, with a tungsten oxide content of 82 wt %), 8.7 g basic nickel carbonate (manufactured by Jiangsu Yixing Xuchi Chemical Ltd., with a nickel oxide content of 51 wt %), and 10.5 g citric acid, then dried at 180° C. for 10 hrs to obtain a catalyst, named as catalyst C-1. Based on the total amount of the catalyst, the mass fractions of metal components in C-1 were listed in Table 3.

Example 2

133 g pseudo-boehmite powder PB1-1 was mixed with 136 g PB2-2 (with a dry basis of 0.92), 366.7 g ultrastable molecular sieve LAY and 16 g sesbania powder, then extruded into a trefoil strand having a circumcircle diameter of 1.6 mm, dried at 120° C. and calcined at 600° C. for 3 hrs to obtain a support. The composition of such catalyst support was shown in Table 3.

After cooled to room temperature, 100 g support was weighted and impregnated with 84 ml aqueous solution containing 51 g ammonium metatungstate (manufactured by Sichuan Zigong Hard Alloy Factory, with a tungsten oxide content of 82 wt %), 8.7 g basic nickel carbonate (manufactured by Jiangsu Yixing Xuchi Chemical Ltd., with a nickel oxide content of 51 wt %), and 10.5 g citric acid, then dried at 180° C. for 10 hrs to obtain a catalyst, named as catalyst C-2. Based on the total amount of the catalyst, the mass fractions of metal components in C-2 were listed in Table 3.

Comparative Example 2

Example 2 was repeated except that PB2-2 was replaced with 125 g PB2-3. A catalyst was obtained, named as catalyst R-2. Based on the total amount of the catalyst, the mass fractions of metal components in R-2 were listed in Table 3.

Example 3

267 g pseudo-boehmite powder PB1-3 (with a dry basis of 0.76) was mixed with 28 g PB2-1 (with a dry basis of 0.89), 340 g phosphor-containing ultrastable molecular sieve PUSY (manufactured by Sinopec Catalyst Company Chang Ling Catalyst Plant, with a trade name of USY-5, phosphorus pentoxide content of 1.2%, a lattice constant of 24.44 angstrom, a pore volume of 0.40 ml/g, a dry basis of 0.81)

and 16 g sesbania powder, then extruded into a trefoil strand having a circumcircle diameter of 1.6 mm, dried at 120° C. and calcined at 600° C. for 3 hrs to obtain a support. The composition of such catalyst support was shown in Table 3.

After cooled to room temperature, 100 g support was weighted and impregnated with 90 ml aqueous solution containing 51 g ammonium metatungstate (manufactured by Sichuan Zigong Hard Alloy Factory, with a tungsten oxide content of 82 wt %), 8.7 g basic nickel carbonate (manufactured by Jiangsu Yixing Xuchi Chemical Ltd., with a nickel oxide content of 51 wt %), and 10.5 g citric acid, then dried at 140° C. for 3 hrs to obtain a catalyst, named as catalyst C-3. Based on the total amount of the catalyst, the mass fractions of metal components in C-3 were listed in Table 3.

Example 4

530 g pseudo-boehmite powder PB1-3 (with a dry basis of 0.76) was mixed with 56 g PB2-1 (with a dry basis of 0.89), 62 g phosphor-containing ultrastable molecular sieve PUSY (manufactured by Sinopec Catalyst Company Chang Ling Catalyst Plant, with a trade name of USY-5, phosphorus pentoxide content of 1.2%, a lattice constant of 24.44 angstrom, a pore volume of 0.40 ml/g, a dry basis of 0.81) and 16 g sesbania powder, then extruded into a trefoil strand having a circumcircle diameter of 1.6 mm, dried at 120° C. and calcined at 480° C. for 8 hrs to obtain a support. The composition of such catalyst support was shown in Table 3.

After cooled to room temperature, 100 g support was weighted and impregnated with 90 ml aqueous solution containing 30 g ammonium metatungstate (manufactured by Sichuan Zigong Hard Alloy Factory, with a tungsten oxide content of 82 wt %), 18 g basic nickel carbonate (manufactured by Jiangsu Yixing Xuchi Chemical Ltd., with a nickel oxide content of 51 wt %), and 25 g citric acid, then dried at 110° C. for 20 hrs to obtain a catalyst, named as catalyst C-4. Based on the total amount of the catalyst, the mass fractions of metal components in C-4 were listed in Table 3.

TABLE 3

| Examples | Catalysts | Supports PB-2, wt % | PB-1, wt % | Molecular sieve, wt % | the ratio of the pore volume of 300-500 nm pore to the total pore volume, % | NiO, wt % | $WO_3$, wt % |
|---|---|---|---|---|---|---|---|
| Comparative Example 1 | R-1 | | 45 | 55 | 0.3 | 2.85 | 28 |
| 1 | C-1 | | 45 | 55 | 2.3 | 2.85 | 28 |
| 2 | C-2 | 25 | 20 | 55 | 1.6 | 2.85 | 28 |
| Comparative Example 2 | R-2 | 25 | 20 | 55 | 2.3 | 2.85 | 28 |
| 3 | C-3 | 5 | 40 | 55 | 1.9 | 2.85 | 28 |
| 4 | C-4 | 10 | 80 | 10 | 0.9 | 7 | 18 |

Example 5

The present example showed the performance of the catalyst of the invention.

The raw material oil used was a vacuum gas oil, whose physicochemical properties were shown in Table 4.

In the present example, the catalyst was evaluating as follow: smashing the catalyst into particles with a diameter of 2-3 mm; putting 20 ml of the catalyst into a 30 ml fixed bed reactor; prior to the desired reaction, conducting sulfurization according to the following process under an atmosphere of hydrogen with kerosene oil containing 2 wt % of carbon disulfide; then switching to the raw material to carry out the desired reaction.

Sulfurization process: sulfurized oil was introduced after raising temperature of the reactor to 150° C.; the temperature was kept constant for 1 hr to allow an adsorption temperature wave passing the reactor; the temperature was raised to 230° C. at 60° C./hr and kept for 2 hrs, then was raised to 360° C. at 60° C./hr and kept for 6 hrs.

After switch to the reactant oil, the reaction temperature was adjusted to 355° C. and kept for at least 20 hrs. The partial pressure of the reactant hydrogen was 6.4 Mpa, the liquid hourly space velocity (LHSV) was 1 $hr^{-1}$, and the ratio (by volume) of hydrogen to oil was 800. The evaluated catalysts and the results were listed in Table 5.

TABLE 4

| | raw material oil |
|---|---|
| density (20° C.), $g/cm^3$ | 0.8885 |
| S, wt % | 16000 |
| N, mg/l | 352 |
| simulated distillation (ASTM D-2887) | |
| IBP | 291 |
| 50 | 391 |
| 90 | 421 |

After reaction, the product obtained was subjected to vacuum distillation at 350° C. The resulted product was subjected to Mass spectrometry to analyze the composition of the same. The results were shown in Table 5.

TABLE 5

| Catalysts | Aromatic hydrocarbons in the tail oil | Reduction of aromatic hydrocarbons |
|---|---|---|
| R-1 | 3.5 | as basis, % |
| C-1 | 3.0 | 15 |
| C-2 | 2.6 | 25 |
| C-3 | 2.4 | 32 |
| R-2 | 6.0 | Aromatic hydrocarbons increase by about 70% |

Since the reaction pressure of catalyst evaluation process was low, aromatic hydrocarbons in the tail oil were close to the so called thermodynamic balance value. The process of the present invention led to a reduction in the amount of the romatic hydrocarbons in the tail oil by 10-35%.

Comparative Example 3

267 g pseudo-boehmite SB (with a dry basis of 0.75, measured by placing a certain amount of powder as obtained in a crucible with a cover, putting it in a muffle furnace, raising the temperature to 700° C. and keeping the temperature constant for 1 hr, and then calculating the ratio of the remained powder to the initial powder, the same hereinafter) was mixed with 395 g amorphous silica-alumina (provided by Condea company, Germany, with a trade name of Siral-40, a pore volume of 0.88 ml/g, a specific surface area of 468 m²/g, a silica content of 40 wt %, a dry basis of 0.76) and 16 g sesbania powder, then was extruded into a trefoil strand having a circumcircle diameter of 1.6 mm, dried at 120° C. for 3 hrs and calcined at a temperature of 600° C. for 3 hrs, to obtain a support. The composition of such catalyst support was shown in Table 6.

After cooled to room temperature, 100 g support was weighted and impregnated with 78 ml aqueous solution containing 50 g ammonium metatungstate (manufactured by Sichuan Zigong Hard Alloy Factory, with a tungsten oxide content of 82 wt %), 8.7 g basic nickel carbonate (manufactured by Jiangsu Yixing Xuchi Chemical Ltd., with a nickel oxide content of 51 wt %), and 10.5 g citric acid, then dried at 180° C. for 10 hrs to obtain a catalyst, named as catalyst R-3. Based on the total amount of the catalyst, the mass fractions (calculated value, the same hereinafter) of metal components in R-3 were listed in Table 6.

Example 6

267 g pseudo-boehmite powder PB1-1 (with a dry basis of 0.75) was mixed with 3695 g amorphous silica-alumina (the same as the comparative example 3) and 16 g sesbania powder, then extruded into a trefoil strand having a circumcircle diameter of 1.6 mm, dried at 120° C. for 3 hrs and calcined at 600° C. for 3 hrs to obtain a support. The composition of such catalyst support was shown in Table 6.

After cooled to room temperature, 100 g support was weighted and impregnated with 87 ml aqueous solution containing 51 g ammonium metatungstate (manufactured by Sichuan Zigong Hard Alloy Factory, with a tungsten oxide content of 82 wt %), 8.7 g basic nickel carbonate (manufactured by Jiangsu Yixing Xuchi Chemical Ltd., with a nickel oxide content of 51 wt %), and 10.5 g citric acid, then dried at 180° C. for 10 hrs to obtain a catalyst, named as catalyst C-5. Based on the total amount of the catalyst, the mass fractions of metal components in C-5 were listed in Table 6.

Example 7

133 g pseudo-boehmite powder PB1-1 was mixed with 109 g PB2-2 (with a dry basis of 0.92), 394 g amorphous silica-alumina (the same as the example 6) and 16 g sesbania powder, then extruded into a trefoil strand having a circumcircle diameter of 1.6 mm, dried at 120° C. and calcined at 600° C. for 3 hrs to obtain a support. The composition of such catalyst support was shown in Table 6.

After cooled to room temperature, 100 g support was weighted and impregnated with 94 ml aqueous solution containing 51 g ammonium metatungstate (manufactured by Sichuan Zigong Hard Alloy Factory, with a tungsten oxide content of 82 wt %), 8.7 g basic nickel carbonate (manufactured by Jiangsu Yixing Xuchi Chemical Ltd., with a nickel oxide content of 51 wt %), and 10.5 g citric acid, then dried at 180° C. for 10 hrs to obtain a catalyst, named as catalyst C-6. Based on the total amount of the catalyst, the mass fractions of metal components in C-6 were listed in Table 6.

Comparative Example 4

Example 7 was repeated except that PB2-2 was replaced with 100 g PB2-3. A catalyst was obtained, named as catalyst R-4. Based on the total amount of the catalyst, the mass fractions of metal components in R-4 were listed in Table 6.

Example 8

131.6 g pseudo-boehmite powder PB1-3 (with a dry basis of 0.76) was mixed with 224.7 g PB2-1 (with a dry basis of 0.89), 267 g amorphous silica-alumina (provided by Condea company, Germany, with a trade name of Siral-20, a pore volume of 0.49 ml/g, a specific surface area of 590 m²/g, a silica content of 20 wt %, a dry basis of 0.75) and 16 g sesbania powder, then extruded into a trefoil strand having a circumcircle diameter of 1.6 mm, dried at 120° C. and calcined at 600° C. for 3 hrs to obtain a support. The composition of such catalyst support was shown in Table 6.

After cooled to room temperature, 100 g support was weighted and impregnated with 92 ml aqueous solution containing 51 g ammonium metatungstate (manufactured by Sichuan Zigong Hard Alloy Factory, with a tungsten oxide content of 82 wt %), 8.7 g basic nickel carbonate (manufactured by Jiangsu Yixing Xuchi Chemical Ltd., with a nickel oxide content of 51 wt %), and 10.5 g citric acid, then dried at 140° C. for 3 hrs to obtain a catalyst, named as catalyst C-7. Based on the total amount of the catalyst, the mass fractions of metal components in C-7 were listed in Table 6.

Example 9

460 g pseudo-boehmite powder PB1-3 (with a dry basis of 0.76) was mixed with 56 g PB2-1 (with a dry basis of 0.89), 267 g amorphous silica-alumina (provided by Condea company, Germany, with a trade name of Siral-30, a pore volume of 0.78 ml/g, a specific surface area of 455 m²/g, a silica content of 30 wt %, a dry basis of 0.75) and 16 g sesbania powder, then extruded into a trefoil strand having a circumcircle diameter of 1.6 mm, dried at 120° C. and calcined at 480° C. for 8 hrs to obtain a support. The composition of such catalyst support was shown in Table 6.

After cooled to room temperature, 100 g support was weighted and impregnated with 94 ml aqueous solution containing 30 g ammonium metatungstate (manufactured by Sichuan Zigong Hard Alloy Factory, with a tungsten oxide content of 82 wt %), 18 g basic nickel carbonate (manufactured by Jiangsu Yixing Xuchi Chemical Ltd., with a nickel oxide content of 51 wt %), and 25 g citric acid, then dried at 110° C. for 20 hrs to obtain a catalyst, named as catalyst C-8. Based on the total amount of the catalyst, the mass fractions of metal components in C-8 were listed in Table 6.

TABLE 6

| Examples | Catalysts | Supports PB-2, wt % | PB-1, wt % | amorphous silica-alumina, wt % | the ratio of the pore volume of 300-500 nm pore to the total pore volume, % | NiO, wt % | WO$_3$, wt % |
|---|---|---|---|---|---|---|---|
| Comparative Example 3 | R-3 | | 40 | 60 | 3.2 | 2.85 | 28 |
| 6 | C-5 | | 40 | 60 | 4.3 | 2.85 | 28 |
| 7 | C-6 | 20 | 20 | 60 | 4.0 | 2.85 | 28 |
| Comparative Example 4 | R-4 | 20 | 20 | 60 | 5.4 | 2.85 | 28 |
| 8 | C-7 | 40 | 20 | 40 | 4.6 | 2.85 | 28 |
| 9 | C-8 | 70 | 10 | 20 | 3.1 | 7 | 18 |

Example 10

Example 5 was repeated with catalyst R-3, C-5, C-6 and R-4. The results were shown in Table 7.

TABLE 7

| Catalysts | Aromatic hydrocarbons in the tail oil | Reduction of aromatic hydrocarbons |
|---|---|---|
| R-3 | 14.6 | as basis, % |
| C-5 | 13.2 | 10 |
| C-6 | 7.8 | 53 |
| R-4 | 15.8 | Aromatic hydrocarbons increase by about 8% |

Since the reaction pressure of catalyst evaluation process was low, aromatic hydrocarbons in the tail oil were close to the so called thermodynamic balance value. The process of the present invention led to a reduction in the amount of the aromatic hydrocarbons in the tail oil by 10-55%.

The invention claimed is:

1. A hydrocracking catalyst, comprising a support and at least one of VIII Group metal components and at least one of VIB Group metal components, wherein said support comprises an acidic silica-alumina component and alumina derived from a pseudo-boehmite component, wherein the content of the acidic silica-alumina component is 3-80 wt %, the content of alumina derived from the pseudo-boehmite component is 20-95 wt %, based on the support, characterized in that said support is obtained by mixing, moulding, drying and calcining the acidic silica-alumina component with the pseudo-boehmite component, wherein said pseudo-boehmite component comprises pseudo-boehmite PB1 and pseudo-boehmite PB2, wherein the content of PB1 is 10-90 wt % and the content of PB2 is 0-60 wt % on a dry basis and based on the support, when characterizing PB1 by X-ray diffraction, $\kappa_1$ and $\kappa_2$ of said PB1 are respectively from more than 1 to less than or equal to 3, wherein $\kappa_1=h_2/h_1$, $\kappa_2=h_3/h_2$, and $h_1$, $h_2$ and $h_3$ are respectively peak height of three diffraction peaks in the X-ray diffraction pattern of PB1 at 2θ angle of 24-30°, 35-41° and 46-52°, when characterizing PB2 by infrared spectrogram, δ value of PB2 is 1.5-4.5, wherein $\delta=I_1/(I_2+I_3)$, $I_1$ is the peak height of absorption peak at 3665-3680 cm$^{-1}$ in the infrared spectrogram of hydroxy group of PB2, $I_2$ is the peak height of absorption peak at 3720-3730 cm$^{-1}$, and $I_3$ is the peak height of absorption peak at 3760-3780 cm$^{-1}$.

2. The catalyst according to claim 1, characterized in that the content of the acidic silica-alumina component is 5-65 wt %, the content of alumina derived from the pseudo-boehmite component is 30-90 wt %, based on the support.

3. The catalyst according to claim 2, characterized in that when characterizing PB1 by X-ray diffraction, $\kappa_1$ and $\kappa_2$ of PB1 are respectively 1.02-2.4.

4. The catalyst according to claim 2, characterized in that the content of PB1 is 20-80 wt %, and the content of PB2 is 10-50 wt % on a dry basis and based on the support.

5. The catalyst according to claim 1, characterized in that the specific surface area of PB1 is 100-350 m$^2$/g, and the pore volume of PB1 is 0.7-1.2 ml/g.

6. The catalyst according to claim 1, characterized in that the acidic silica-alumina component comprises zeolite and/or an amorphous silica-alumina.

7. The catalyst according to claim 6, characterized in that, based on the amorphous silica-alumina, the content of alumina in the amorphous silica-alumina is 10-80 wt %.

8. The catalyst according to claim 6, characterized in that, the amorphous silica-alumina has a specific surface area of 350-750 m$^2$/g and a pore volume of 0.4-1.2 ml/g.

9. The catalyst according to claim 1, characterized in that the acidic silica-alumina component is one or more Y-type molecular sieves selected from a group consisting of a HY-zeolite, a rare earth type Y-zeolite, a rare earth type HY-zeolite, a ultrastable Y-zeolite, a rare-earth type ultrastable Y-zeolite, and a dealuminized Y-zeolite.

10. The catalyst according to claim 9, characterized in that the lattice constant of the Y-type molecular sieve is 2.460-2.430 nm, the specific surface area is 550-700 m$^2$/g, and the pore volume is 0.30-0.45 ml/g.

11. The catalyst according to claim 9, characterized in that the Y-type molecular sieve contains phosphor, and the content of phosphor is 0.1-2.5 wt %, based on the molecular sieve.

12. The catalyst according to claim 1, characterized in that the VIII Group metal component(s) is/are selected from nickel and/or cobalt, and the VIB Group metal component(s) is/are selected from molybdenum and/or tungsten, wherein the content of the nickel and/or cobalt is 1-15 wt % and the content of molybdenum and/or tungsten is 5-40 wt % as calculated on oxide and based on weight of the catalyst.

13. The catalyst according to claim 1, characterized in that the δ value of PB2 is 1.8-3.8.

14. The catalyst according to claim 1, characterized in that PB2 is a modified product of PB1 obtained by drying PB1 for 0.5-14 hrs at a temperature of 70-400° C.

15. A process of processing an hydrocarbon oil, comprising:
providing a catalyst of claim 1; and
processing the hydrocarbon oil under hydrocracking conditions in presence of the catalyst of claim 1.

* * * * *